US012725155B2

(12) United States Patent
Lohar et al.

(10) Patent No.: US 12,725,155 B2
(45) Date of Patent: Sep. 1, 2026

(54) SMART CARD WITH HARD-WIRED TAMPER DETECTION SYSTEM

(71) Applicant: Bank of America Corporation, Charlotte, NC (US)

(72) Inventors: Sanjay Lohar, Charlotte, NC (US); Jesus Alvarez Solis, Buckeye, AZ (US); Karen McFeeters, York, SC (US); Madeline Fest, Charlotte, NC (US); Kyle Mayers, Charlotte, NC (US); Naomi Verma, Washington, DC (US); Adam Kristian King, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 65 days.

(21) Appl. No.: 18/795,963

(22) Filed: Aug. 6, 2024

(65) Prior Publication Data

US 2026/0044852 A1 Feb. 12, 2026

(51) Int. Cl.
*G06Q 30/00* (2023.01)
*G06Q 20/34* (2012.01)
*G06Q 20/40* (2012.01)

(52) U.S. Cl.
CPC .......... *G06Q 20/401* (2013.01); *G06Q 20/34* (2013.01)

(58) Field of Classification Search
CPC .................................................. G06Q 20/401
USPC .......... 705/41, 1.1, 17, 75, 65, 72; 235/492, 235/488
See application file for complete search history.

(56) References Cited

U.S. PATENT DOCUMENTS 9,965,632 B2 * 5/2018 Zarakas .................. G06F 21/77
10,089,569 B2 10/2018 Wurmfeld et al.
11,113,698 B2 9/2021 Rezayee et al.
11,301,554 B2 * 4/2022 Law ........................ G06F 21/34

OTHER PUBLICATIONS ip.com NPL Search History.*

* cited by examiner

*Primary Examiner* — John H. Holly
(74) *Attorney, Agent, or Firm* — Weiss & Arons LLP

(57) ABSTRACT

A smart card with a hard-wired tamper detection system and near-field communication is provided. The smart card may include a tamper detection unit ("TDU") that may include a smart chip embedded in the smart card. The smart chip may be connected to a battery by two electrical wires. The smart chip may be connected to a simplified onboard tamper alerting system ("SOTAS") by one electrical wire. The smart card may include a stripe scrambling film on a magnetic stripe of the smart card. The SOTAS may be configured to alert an issuer of the smart card in response to a trigger of a tamper detection, the trigger may be a signal received from the TDU in response to a removal of the smart chip from the smart card thereby causing each of the three wires to fracture and may render the smart chip inoperable.

15 Claims, 5 Drawing Sheets

SMART CARD WITH HARD-WIRED TAMPER DETECTION SYSTEM

FIELD OF TECHNOLOGY

Aspects of the disclosure relate to a smart card with tamper detection capabilities.

BACKGROUND OF THE DISCLOSURE

Smart cards are payment instruments that execute transactions at POS devices. Smart cards can include a smart chip, such as a Europay, Mastercard and Visa ("EMV") chip. Smart cards that include an EMV chip are widely used due to ease of use and the enhanced security systems that they provide.

Current EMV chips do not include security measures that prevent removal of the chip from the smart card. Removal of the chip is not desirable at least because removing the chip from a smart card and transplanting it to another smart card can support the processing of unauthorized transactions. Furthermore, most smart cards with EMV chips also include a magnetic stripe/magstripe that retain transaction facilitation capabilities even if the chip card processing is not available.

Therefore, it would be desirable to implement systems and methods for increasing the security of smart cards having EMV chips by detecting chip tampering.

It would further be desirable to implement systems and methods for increasing the security of smart cards that include EMV chips by preventing chip tampering.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
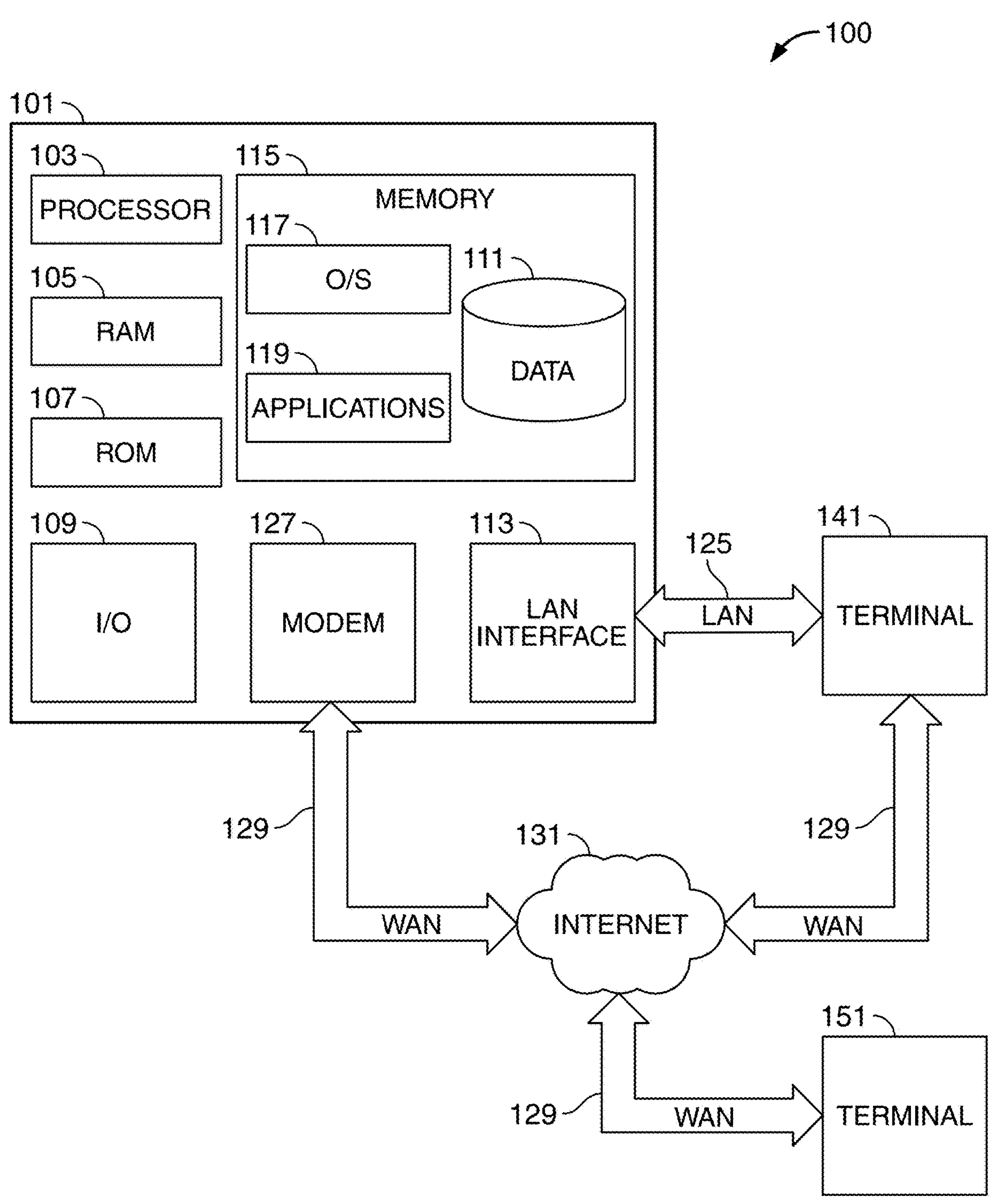
FIG. 1 shows an illustrative block diagram in accordance with principles of the disclosure.

Apparatus and methods for detecting and preventing a tampering of a chip in a smart card is provided.

The smart card may include a smart chip embedded in the layers of the smart card. The smart chip may include a microprocessor and a memory. The smart chip may be a payment instrument configured for transmitting and receiving electronic communications to and from a point of sale ("POS") device.

The smart card may be in electronic communication with an issuer of the smart card. The smart card may be in electronic communication with a financial institution associated with the smart card.

The smart chip may be configured to electronically communicate with the POS device. The smart chip may be configured to electronically communicate with a mobile application associated with a mobile device. The mobile device may be associated with a user of the smart card.

The smart chip may be a Europay, Mastercard and Visa ("EMV") chip.

The smart card may include near-field communication ("NFC") capabilities. NFC capabilities may enable the transmitting and receiving of the electronic communications between the smart chip and the POS.

The smart card may have a thickness wherein the smart card, at its thickest point, may not be thicker than 0.8 millimeters ("mm"). A width and height of the smart card may not be less than 90% of a width of 86 mm and not less than 90% of a height of 54 mm.

A mobile application may be in electronic communication with the smart card via the microprocessor at the smart chip.

The smart card may include metal and/or plastic. The smart card may have dimensions that conform to the ISO/IEC 7810 ID-1 standard. The dimensions may, in some embodiments, be no greater than 86 millimeters×54 millimeters×0.8 millimeters.

The smart card may include a tamper detection unit ("TDU"). The TDU may include a smart chip embedded in the smart card. The smart chip may be an EMV chip. The smart chip may include a microprocessor and a memory. The TDU may be situated beneath a top layer of the smart card. The TDU may be situated on the top layer of the smart card and beneath the top layer of the smart card.

The smart chip may be connected to a battery embedded in the smart card. The smart chip may be connected to the battery by two electrical wires connecting the smart chip to the battery in a circuit. The circuit may enable communication between the smart chip and one or more NFC devices.

The electrical wires may be sufficiently fragile to break sufficiently easily upon removal or other tampering with of the EMV chip. Specifically, the electrical wires may break when the chip is removed from the smart card. It should be appreciated that normal wear and tear of the smart card, including rubbing out of the face of the smart chip on the front of the card, may preferably not cause the wires to break since the wires may be situated beneath the top layer of the smart card.

The smart card may include a simplified onboard tamper alerting system ("SOTAS"). The SOTAS may be a tamper alert system that may transmit alerts to the issuer of the smart card in response to a trigger. One electrical wire may connect the smart chip to the SOTAS. In other embodiments more than one electric wire may connect the smart chip to the SOTAS.

The smart card may include a stripe scrambling film ("SSF") on a magnetic stripe of the smart card. The SSF may be a flexible and resilient film layered on the magnetic stripe. The SSF may be connected to the smart chip by one or more electrical wires. It should be appreciated that, in certain embodiments, when the smart chip is removed from the smart card, the SSF along with the magnetic stripe may also be automatically detached from the smart card or otherwise disabled.

The magnetic stripe on the smart card may be connected to the smart chip. The magnetic stripe may authenticate and/or execute transactions upon receipt of a token from the smart chip. When the smart chip becomes inoperable, the magnetic stripe may be inoperable too.

The magnetic stripe may be in a default inactive state. The magnetic stripe may be in an active state when prompted by the smart chip. The prompt may be a receipt of the token from the smart chip.

In some embodiments, the smart chip may generate a token for each transaction. The token may be transmitted to the magnetic stripe via power generated by the battery. The token may then be valid for a single transaction. This may be an additional layer of authentication when using the smart card to perform a transaction.

In some embodiments, the POS device may leverage both the scanning of the smart chip and a receipt of the token from the magnetic stripe to execute a transaction. When the EMV chip is being tampered with, the magnetic stripe automatically may be rendered inoperable by being extracted from the smart card along with the smart chip.

It should be appreciated that the magnetic stripe may be in an inactive state pending receipt of a communication from the smart chip. The magnetic stripe may not be enabled for use for executing a transaction without receipt of the communication from the smart chip. The communication may be a token generated by the smart chip.

The magnetic stripe may be activated upon receipt of a token from the smart chip. The token may be a one-time code for authenticating a transaction.

The smart card may include a kinetic energy generation system ("KEGS"). The KEGS may be configured for powering the battery embedded in the smart card. The KEGS may include a weighted element oscillating in the smart card. The weighted element may be configured to convert each linear movement into electrical energy. The electrical energy may provide energy to be stored in the battery on the smart card.

In some embodiments, the battery may be configured to recharge via solar energy, inductive charging, a charging port, and/or any other suitable charging mechanism.

The SOTAS running on the smart card may be configured to alert an issuer of the smart card in response to a trigger of a tamper detection. The trigger may be a signal received from the TDU. The trigger may be in response to a removal of the smart chip from the smart card which may automatically cause each of the three wires to break.

The SOTAS may be powered by the battery. The SOTAS may include an antennae running along an edge of the smart card. The antennae may be configured for transmitting signals from the smart card to a receiver associated with the issuer.

The SOTAS may be further configured to transmit, in response to receiving a signal indicative of tampering, a signal indicating a geolocation of the smart card. A geolocation circuit may be embedded in the smart card.

It should be appreciated that when the trigger of the tamper detection is detected, the SOTAS may be triggered to transmit an alert to the issuer of the smart card of the tamper detection. The issuer may receive the alert and pause any associated in-process transactions from being executed.

Additionally, in response to the alert, the issuer may deactivate any digital card that is associated with the smart card.

The issuer may also receive the geolocation of the smart card at the time of the tamper detection. The issuer may transmit an electronic communication to one or more mobile devices of members of the fraud team notifying of the tamper detection.

When more than one tamper detection alert is received from the same geolocation, the issuer may be configured to transmit an electronic communication to mobile devices associated with smart cards that may be within the same geolocation as the smart card being tampered.

Upon removal of the smart chip, each of the wires may break. The breaking of the wires may automatically cause the magnetic stripe to disconnect from the smart card. The breaking of the wires may also cause the smart chip to become inoperable.

It should be appreciated that when the wires break, the data stored on the smart chip may be unreadable. The data may also be inaccessible.

A method for detecting and preventing a tampering of a smart chip embedded on a smart card is provided.

The detecting may be performed via the SOTAS. The SOTAS may be powered by a battery stored on the smart card. It should be appreciated that the battery may be powered by kinetic energy via a KEGS running on the smart card.

The method may include receiving, at the SOTAS, a tamper detection electronic signal from the TDU running on the smart card. The tamper detection electronic signal transmitted to the SOTAS may be in response to a fracture of electrical wires embedded in the smart card. In some embodiments all three electrical wires may be fractured. In some embodiments, one, two or three electrical wires may be fractured.

The fracture of one or more electrical wires may be caused by a removal of the smart chip from the smart card.

The smart card may not be limited to three wires. The smart card may include any suitable number of wires embedded in the smart card.

The fracture may be a fracture of wires connecting the smart chip to a battery, the smart chip to the TDU and the smart chip to a stripe scrambling film ("SSF") on a magnetic stripe.

There may be two wires connecting the smart chip to the battery. A positive wire and a negative wire may be connected to complete the circuit and power the chips communication circuitry.

One wire may connect the smart chip to the SOTAS. There may be an additional connection from the smart chip to the magnetic stripe.

In response to the receiving of the tamper detection electronic signal, the method may include transmitting, from the SOTAS to an issuer of the smart card, an alert of the tampering of the smart chip.

The method may further include deactivating a use of the smart card and each transaction being associated with the smart card.

It should be appreciated that the fracturing of the electrical wires may automatically cause the smart chip to be inoperable. Additionally, any data stored on the smart chip may not be accessible or readable when inoperable.

Additionally, when the smart chip is removed from the smart card, the SSF may be automatically disconnected from the smart card along with the magnetic stripe that the SSF is connected to.

In some embodiments, the smart card may include a top layer, a second layer, a third layer a fourth layer and a bottom layer.

The top layer may include a first portion of the smart chip and card identification data.

The second layer may include the TDU. The TDU may include a second portion of the smart chip.

The smart chip may be connected to a battery, wherein two electrical wires at least partially embedded in the second layer may connect the second portion of the smart chip to the battery in a circuit. The circuit may enable communication between the smart chip and one or more NFC devices.

The smart chip may also be connected to the SOTAS. The SOTAS may be on the third layer of the smart card. One electrical wire may connect the smart chip to the SOTAS.

The SOTAS may be configured to alert an issuer of the smart card in response to a trigger of a tamper detection of the smart chip. The trigger received at the SOTAS may be in response to a removal of the smart chip from the smart card and may cause each of three wires to fracture.

The fourth layer may include the battery and the KEGS configured for powering the battery.

The bottom layer may include the SSF on the magnetic stripe of the smart card.

In certain embodiments, the smart card may include apparatus and methods described in U.S. patent application Ser. No. 16/882,482, filed on May 23, 2020, now U.S. Pat. No. 11,928,653 both of which are hereby incorporated by reference herein in their entireties.

The smart card may also include a wireless network interface card ("NIC").

In some embodiments, the smart card may include a payment interface to resolve different payment options to different secure payment gateways.

In some embodiments, the smart card may include a phone to bank resolver that associates contact phone numbers with accounts at financial institutions or other smart card issuers.

In some embodiments, the smart card may include a reverse payment initiator that may be configured to request a payment amount from a contact bank account and contact smart card and send payment instructions to a payment gateway.

In some embodiments, the microprocessor, the power source, the wireless interface, the payment interface, and/or the memory may be embedded in the smart card. The touch sensitive screen may be affixed to the smart card and may be exposed on a surface of the smart card.

The smart card may include hardware and associated integrated circuitry for users to complete online payments without entering sensitive transaction information into a third-party system such as a web browser or other software applications. The smart card may include a touch-sensitive screen. The smart card may include a virtual keypad. The user may depress keys on the keypad or use the touch-sensitive screen to enter information directly into the smart card.

The microprocessor and associated NIC may enable the card to establish a communication channel. Over the secure communication channel, the smart card may interact directly with a secure system for making a payment. The secure system may be operated by an issuer of the smart card. The microprocessor may have a thickness that is not greater than 0.25 millimeters ("mm"). The microprocessor may control overall operation of the smart card and its associated components.

The smart card may include various other hardware components. Such components may include a speaker, and antenna(s). The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the smart card to perform various functions. For example, software may include an operating system, application programs, web browser and a database. Alternatively, some or all of computer executable instructions of the smart card may be embodied in hardware or firmware components of the smart card. Application programs, which may be used by the smart card, may include computer executable instructions for invoking user functionality related to communication, authentication services, and voice input and speech recognition applications.

Application programs may utilize one or more algorithms that encrypt information, process received executable instructions, interact with an issuer or acquirer bank systems, perform power management routines or other suitable tasks.

The smart card may include a pressure sensitive button. The pressure sensitive button may have a thickness that is not greater than 0.8 mm. A user may actuate the pressure sensitive to power on or off one or more components of the smart card. For example, actuating the pressure sensitive button may activate the microprocessor, NIC, touch-sensitive screen of the smart card.

The smart card may operate in a networked environment. The smart card may support establishing communication channels with one or more issuer or acquirer bank systems. The smart card may connect to a local area network ("LAN"), a wide area network ("WAN") a cellular network or any suitable communication network. When used in a LAN networking environment, the smart card may be connected to the LAN through a network interface or adapter. The NIC may include the network interface or adapter.

When used in a WAN networking environment, the smart card may include a modem or other means for establishing communications over a WAN, such as the Internet. The NIC may include the modem. It will be appreciated that the existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, other smart cards, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

In some embodiments, the smart card may include an electrical contact. The battery may be recharged via an electrical contact when the smart card is inserted into an Automated Teller Machine ("ATM"). An electrical contact may be constructed using any suitable material that conducts or transfers electricity. The smart card may include a plurality of electrical contacts. An electrical contact may be accessible on any suitable face of a housing of the smart card. The contact may be utilized to transfer electrical charge to the rechargeable battery when the smart card is inserted into a card reader of the ATM. In some embodiments, the smart card's power source may include high frequency signals received from an ATM or other network node. The smart card may be configured to utilize received high frequency signals to recharge the battery or provide power to other hardware components of the smart card. The high frequency signals may conform to a standardized NFC communication standard.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein, such as the smart card, the POS device, the smart chip, the magnetic stripe and one or more servers associated with the issuer and the financial institution. Elements of the TDU and the SOTAS may also be included in computer 101. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications, instructions and algorithms associated with and/or embedded within the smart card, the POS device, the TDU, the SOTAS, the smart chip, the magnetic stripe and any other applications described herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure. Applications 119 may include one or more applications running at the TDU, the SOTAS, the servers of the issuer and/or financial institution and any other application described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
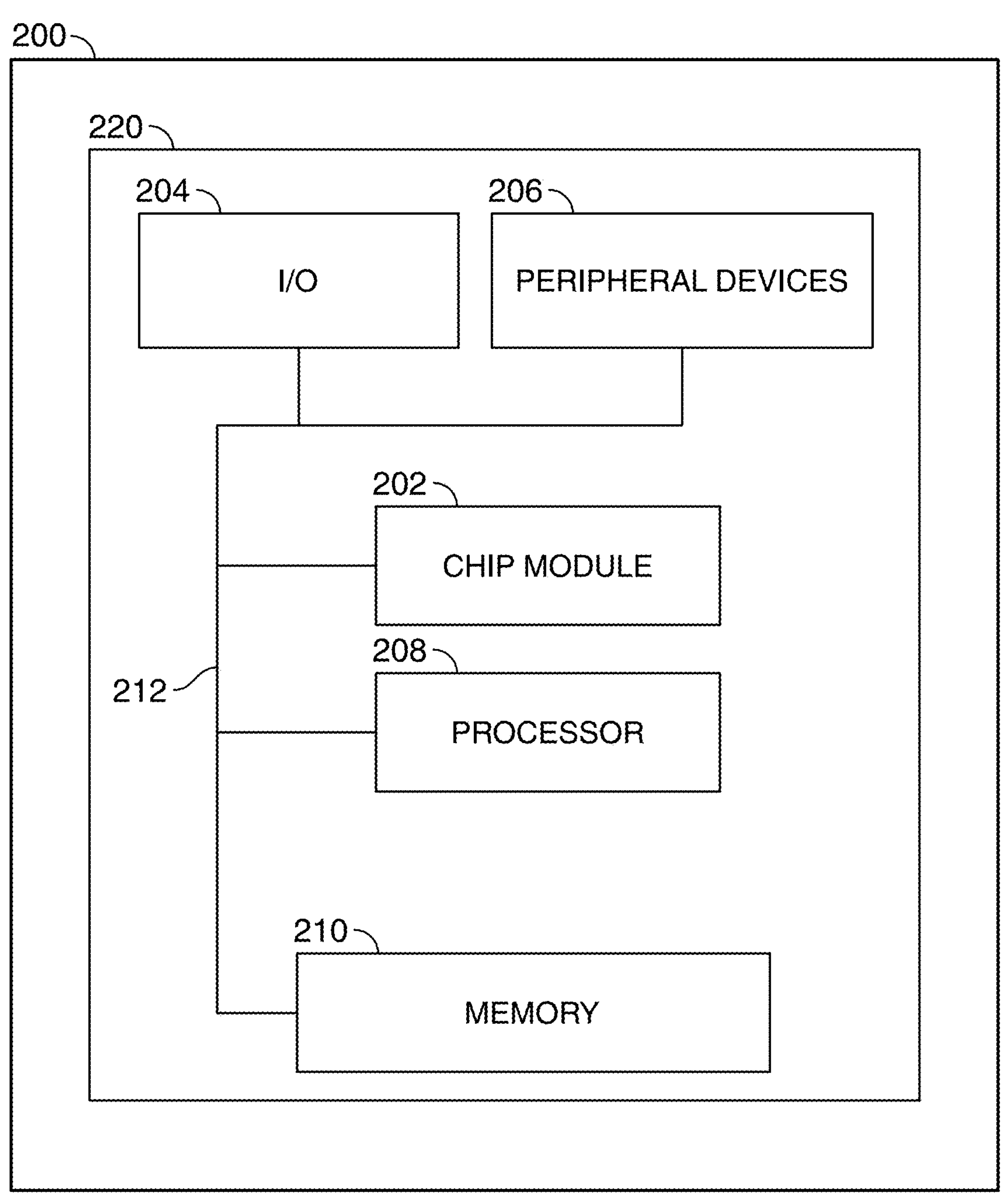
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
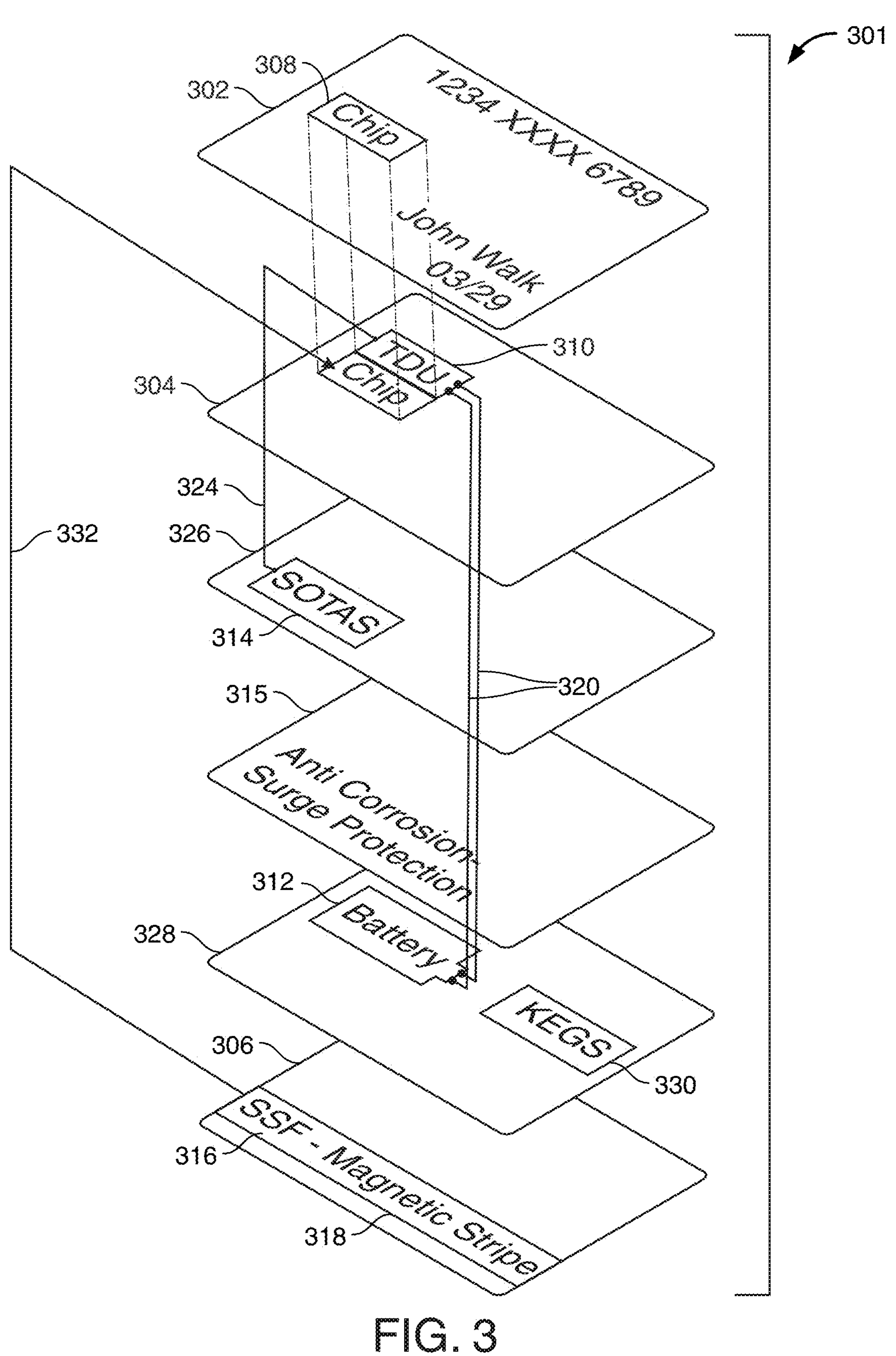
FIG. 3 shows an illustrative architecture diagram in accordance with principles of the disclosure.

FIG. 3 shows an illustrative architecture diagram 300 of the smart card in accordance with principles of the disclosure.

Smart card 301 may be a card configured for performing transactions. Smart card 301 may include metal and/or plastic. The card may have dimensions that conform to the ISO/IEC 7810 ID-1 standard. The dimensions may, in some embodiments, be no greater than 86 millimeters×54 millimeters×0.8 millimeters, as shown at 306.

Smart card 301 may include a plurality of layers. In this diagram, the smart card illustrated includes six layers. The top layer may be displayed at 302. The second layer may be displayed at 304. The third layer may be displayed at 326. The fourth layer may be displayed at 315. The fifth layer may be displayed at 328. The bottom layer may be displayed at 306. The smart card may be one, two, three, four, five, six or any other suitable number of layers. The layering may be of varying thicknesses.

Smart card 301 may include a smart chip 308. Smart chip 308 may be an EMV chip. EMV chip 308 may be situated on the top layer of the card at 302. EMV chip 308 may be embedded throughout all the layers of the smart card. By embedding the EMV chip 308 throughout the layers of the smart card, wear and tear of the smart cart may not affect the functionality of the EMV chip.

At layer 304, TDU 310 may be situated. The TDU may include the smart chip 308.

The TDU may include a plurality of wires connecting the smart chip 308 to other parts of the smart card 301. There may be two wires, shown at 320, that may connect the smart chip to battery 312. Wires 320 may connect the smart chip from the second layer 304 to the battery 312 situated at layer 5, shown at 328, by traversing the third layer 326 and the fourth layer 315. An additional wire 324 or a plurality of wires may connect the TDU 310 to the SOTAS 314. SOTAS 314 may be situated at layer 3, shown at 326.

Layer 4, shown at 315, may be an anti-corrosion/surge protection layer. Layer 4 may be for protecting the battery. Layer 4 may protect the battery from corroding and/or leaking.

Layer 5, shown at 328 may include the battery 312 and the KEGS 330. KEGS 330 may power battery 312 using kinetic energy.

Additionally, elements of the chip 308 may be connected to SSF 316, as shown at 332. SSF 316 may be on the bottom layer of the card 306.

When the chip 308 is removed from the smart card, the connection 332 may cause the SSF to also be removed from the chip or otherwise disabled. The SSF may be a film coating the top of the magnetic stripe 318. When the SSF is removed, the magnetic stripe may also automatically be extracted from the smart card 301.

Figure 4:
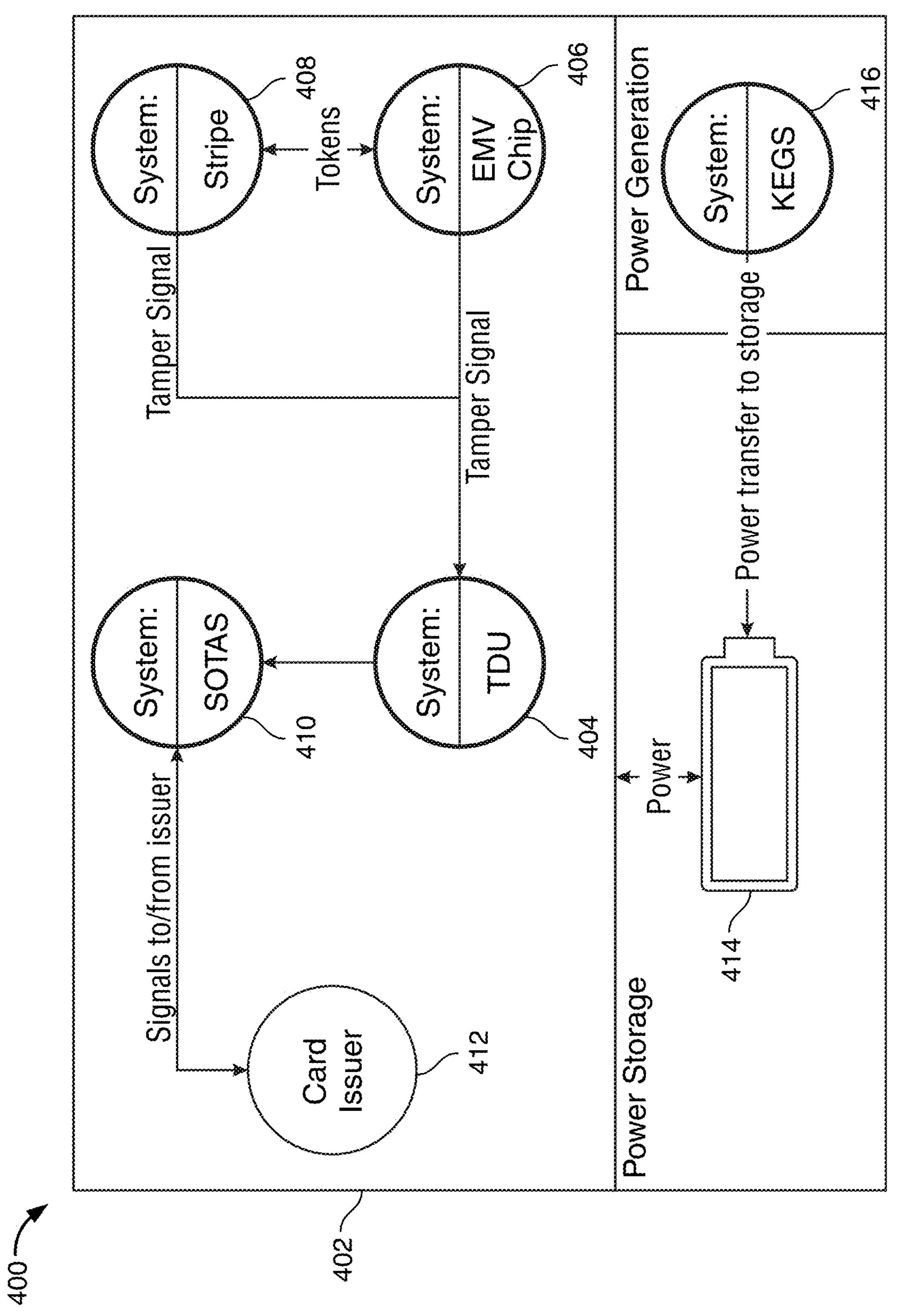
FIG. 4 shows an illustrative architecture diagram in accordance with principles of the disclosure.

FIG. 4 shows an illustrative system architecture 400 in accordance with principles of the disclosure. System architecture 400 shows an illustrative smart card 402 that may include a plurality of hardware and software elements and one or more systems running on the smart card 402.

Smart card 402 may include TDU 404. TDU 404 may be configured to identify occurrences at EMV chip 406 of a tampering of the EMV chip. EMV chip 406 may be embedded on the smart card. EMV chip 406 may be connected by one or more wires to the SOTAS 410, magnetic stripe 408 and battery 414.

In some embodiments, EMV chip 406 may generate one or more tokens and transmit the token(s) to magnetic stripe 408 for an additional layer of authentication for each transaction executed.

When an attempt to extract the EMV chip 406 from the smart card 402, a tamper signal may be transmitted to the SOTAS 410 via the TDU 404. Wires connecting the TDU 404 to SOTAS 410 may be fractured. Fracturing of the wires connecting TDU 404 to SOTAS 410 may trigger the tamper signal to be transmitted to SOTAS 410.

When the EMV chip 406 is extracted from smart card 402, the magnetic stripe 408 may also be automatically extracted from smart card 402 and trigger a tamper signal to be transmitted to SOTAS 410 via TDU 404.

It should be appreciated that SOTAS 410 may be powered by battery 414. Battery 414 may be recharged via KEGS 416. KEGS 416 may leverage kinetic energy. When any preferably mechanically detectable movement of the smart card 402 occurs, energy is built up and stored at battery 414.

Figure 5:
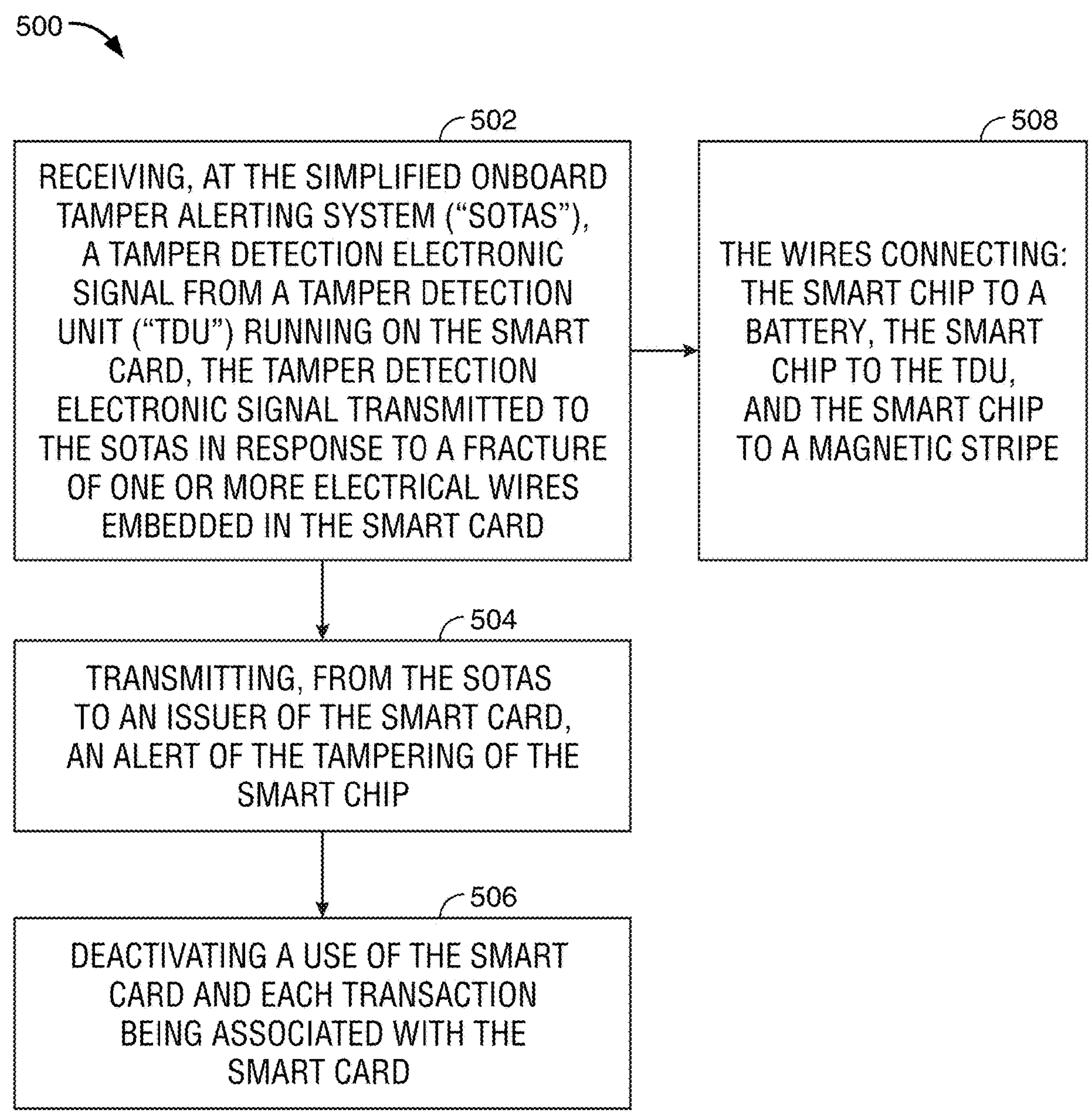
FIG. 5 shows an illustrative flow chart in accordance with principles of the disclosure.

FIG. 5 shows an illustrative flow chart 500 in accordance with principles of the disclosure for a method for detecting tampering of a smart chip on a smart card.

At step 502, the method step may include receiving, at the SOTAS, a tamper detection electronic signal from a TDU. The TDU may be running on the smart card. The tamper detection electronic signal may be transmitted to the SOTAS in response to a fracture of one or more electrical wires embedded in the smart card.

The wires in the smart card may connect the smart chip to the battery on the smart card, the smart chip to the TDU and the smart chip to a magnetic stripe on the smart card, as shown at 508.

At step 504, the method may include transmitting, from the SOTAS to an issuer of the smart card, an alert of the tampering of the smart chip.

At step 506, the method may include deactivating a use of the smart card. The method may also include pausing execution of each transaction associated with the smart card It should be appreciated that the deactivating of the smart card may be an automatic occurrence in response to the tampering. Because the tampering fractures the wires, the smart card becomes unusable. The transactions that are in-process at the time of fracture may be paused pending further activity or cancelled by the issuer of the smart card. These in-process transactions may be occurring online, or via a digital card and therefore may entail the issuer and/or the financial institution to execute a pause/cancel of the transaction.

Thus, systems and methods for detecting and preventing a tampering with a smart chip embedded on a hard-wired smart card in real time is provided. Persons skilled in the art will appreciate that the present invention can be practiced by other than the described embodiments, which are presented for purposes of illustration rather than of limitation.

What is claimed is:

1. A smart card comprising:

a tamper detection unit ("TDU"), the TDU comprising:

a first electrical wire, a second electrical wire, a third electrical wire and a fourth electrical wire;

a smart chip embedded in the smart card, the smart chip comprising a microprocessor and a memory, the smart chip being connected to:

a battery, wherein the first electrical wire and the second electrical wire connect the smart chip to the battery in a circuit, the circuit for enabling communication between the smart chip and one or more near-field communication ("NFC") devices;

a simplified onboard tamper alerting system ("SOTAS"), wherein the third electrical wire connects the smart chip to the SOTAS; and a stripe scrambling film ("SSF") coating a magnetic stripe of the smart card, wherein the fourth electrical wire connects the SSF to the smart chip;

NFC capabilities to enable transmitting and receiving of electronic communications between the smart chip and a point of sale ("POS") device;

a kinetic energy generation system ("KEGS") configured for powering the battery embedded in the smart card;

the SOTAS running on the smart card, the SOTAS is configured to alert an issuer of the smart card in response to a trigger of a tamper detection, the trigger being a signal received from the TDU, wherein the trigger is in response to a removal of the smart chip from the smart card thereby causing each of the first electrical wire, the second electrical wire, third electrical wire and the fourth electrical wire to break;

wherein, in response to the removal of the smart chip from the smart card:

the SOTAS is triggered to transmit an alert to the issuer of the smart card of the tamper detection; and each of the first electrical wire, the second electrical wire, the third electrical wire and the fourth electrical wire fracture and in response to the fracture:

the SSF along with the magnetic stripe automatically detaches from the smart card;

the magnetic stripe becomes inoperable;

data stored on the smart chip is unreadable; and the smart chip becomes inoperable.

2. The smart card of claim 1 wherein the KEGS comprises a weighted element oscillating in the smart card and configured to convert each linear movement into electrical energy, the electrical energy thereby providing energy to the battery on the smart card.

3. The smart card of claim 1 wherein the magnetic stripe remains in an inactive state pending receipt of a communication from the smart chip.

4. The smart card of claim 3 wherein the magnetic stripe is activated upon receipt of a token from the smart chip, wherein the token is a one-time code for authenticating a transaction.

5. The smart card of claim 1 wherein the SOTAS is powered by the battery and comprises an antennae running along an edge of the smart card, the antennae for transmitting signals from the smart card to the issuer.

6. The smart card of claim 5 wherein the SOTAS is further configured to transmit, when being tampered, a signal indicating a geolocation of the smart card.

7. The smart card of claim 1 wherein the smart chip is a Europay, Mastercard and Visa ("EMV") chip.

8. The smart card of claim 1 wherein the TDU is situated beneath a top layer of the smart card.

9. The smart card of claim 1 comprising:

a thickness wherein the smart card, at its thickest point, is not thicker than 0.8 millimeters ("mm"); and a width and height of the smart card is not less than 90% of a width of 86 mm and not less than 90% of a height of 54 mm.

10. The smart card of claim 1 wherein following a receipt of the alert by the issuer of the smart card, any in-process transaction that is associated with the smart card is paused.

11. A method for detecting and preventing a tampering of a smart chip embedded on a smart card, the detecting via a simplified onboard tamper alerting system ("SOTAS"), the detecting enabling protecting a privacy of sensitive data stored on the smart chip, the method comprising:

receiving, at the SOTAS, a tamper detection electronic signal from a tamper detection unit ("TDU") running on the smart card, the tamper detection electronic signal is received in response to a removal of the smart chip from the smart card, the removal of the smart chip causing a first electrical wire, a second electrical wire and a third electrical wire embedded in the smart card to fracture, wherein the fracture is a fracture of:

the first electrical wire connecting the smart chip to a battery;

the second electrical wire connecting the smart chip to the TDU; and the third electrical wire connecting the smart chip to a stripe scrambling film ("SSF") coating a magnetic stripe;

transmitting, from the SOTAS to an issuer of the smart card, an alert of the tampering of the smart chip; and deactivating:

a use of the smart card;

any digital card that is associated with the smart card; and each transaction being associated with the smart card; and wherein, in response to the fracturing of the first electrical wire, the second electrical and the third electrical wire:

the SSF along with the magnetic stripe automatically detaches from the smart card;

the magnetic stripe becomes inoperable;

data stored on the smart chip is unreadable; and the smart chip becomes inoperable.

12. The method of claim 11 wherein the SOTAS is powered by the battery stored on the smart card.

13. The method of claim 12 wherein the battery is powered by kinetic energy via a kinetic energy generation system ("KEGS").

14. A smart card comprising a smart chip embedded in the smart card, the smart card comprising NFC capabilities to enable transmitting and receiving of electronic communications between the smart chip and a point of sale ("POS") device, the smart card comprising:

a top layer comprising a first portion of the smart chip and card identification data;

a second layer comprising a tamper detection unit ("TDU"), the TDU comprising a second portion of the smart chip, the smart chip comprising a microprocessor and a memory, the second portion of the smart chip being connected to:

a battery, wherein a first electrical wire and a second electrical wire are at least partially embedded in the second layer and connect the second portion of the smart chip to the battery in a circuit, the circuit for enabling communication between the smart chip and one or more near-field communication ("NFC") devices; and a simplified onboard tamper alerting system ("SOTAS") residing on a third layer of the smart card, wherein a third electrical wire connects the smart chip to the SOTAS and the trigger received at the SOTAS is in response to a removal of the smart chip from the smart card thereby causing each of the first electrical wire, the second electrical wire and the third electrical wire to fracture;

the third layer comprising the SOTAS, the SOTAS is configured to alert an issuer of the smart card in response to a trigger of a tamper detection of the smart chip, the trigger being received from the TDU;

a fourth layer comprising the battery and a kinetic energy generation system ("KEGS") configured for powering the battery; and a bottom layer comprising a stripe scrambling film ("SSF") on a magnetic stripe of the smart card, a fourth electrical wire connecting the smart chip to the SSF;

wherein, in response to the removal of the smart chip from the smart card:

the SOTAS is triggered to transmit:

an alert to the issuer of the smart card of the tamper detection; and a signal to the issuer indicating a geolocation of the smart card;

each of the first electrical wire, the second electrical wire, the third electrical wire and the fourth electrical wire fracture; and in response to the fracture of each of the first electrical wire, the second electrical wire, the third electrical wire and the fourth electrical wire:

the SSF along with the magnetic stripe automatically detaches from the smart card;

the magnetic stripe becomes inoperable;

data stored on the smart chip is unreadable; and the smart chip becomes inoperable.

15. The smart card of claim 14 comprising:

a thickness wherein the smart card, at its thickest point, is not thicker than 8 millimeters ("mm"); and a width and height of the smart card is not less than 90% of a width of 86 mm and not less than 90% of a height of 54 mm.

* * * * *